(12) United States Patent
Melin et al.

(10) Patent No.: US 7,131,810 B2
(45) Date of Patent: Nov. 7, 2006

(54) CARRIAGE

(75) Inventors: Bo Melin, Smalandsstenar (SE); Christer Larsson, Smalandsstenar (SE); Mikael Hoof, Smalandsstenar (SE); Daniel Karlsson, Burseryd (SE)

(73) Assignee: EAB AB, Smalandsstenar (SE)

( * ) Notice: Subject to any disclaimer, the term of this patent is extended or adjusted under 35 U.S.C. 154(b) by 0 days.

(21) Appl. No.: 10/907,728

(22) Filed: Apr. 13, 2005

(65) Prior Publication Data
US 2005/0191160 A1 Sep. 1, 2005

Related U.S. Application Data

(63) Continuation of application No. PCT/SE03/01567, filed on Oct. 9, 2003.

(30) Foreign Application Priority Data
Oct. 31, 2002 (SE) .................................. 0203202

(51) Int. Cl.
*B65G 1/00* (2006.01)
(52) U.S. Cl. .................... 414/277; 414/279; 414/495
(58) Field of Classification Search ............... 414/277, 414/279, 495, 498
See application file for complete search history.

(56) References Cited

U.S. PATENT DOCUMENTS 3,709,383 A   1/1973   Jennings et al.
4,273,494 A   6/1981   Swain et al.
4,395,181 A * 7/1983   Loomer ....................... 414/284
4,459,078 A * 7/1984   Chiantella et al. .......... 414/279
4,511,110 A * 4/1985   Moller ......................... 248/421
5,020,961 A * 6/1991   Maki-Rahkola et al. .... 414/495
5,033,928 A   7/1991   Suominen
5,388,657 A   2/1995   Shiraishi
6,019,565 A * 2/2000   Gesuale ....................... 414/458

FOREIGN PATENT DOCUMENTS

DE          3213983 A1   10/1983

OTHER PUBLICATIONS

International Search Report from PCT /SE2003/001567.

* cited by examiner

*Primary Examiner*—Eileen D. Lillis
*Assistant Examiner*—Charles A. Fox
(74) *Attorney, Agent, or Firm*—White, Redway & Brown LLP

(57) ABSTRACT

A carriage for transport of a load, for example a load pallet, along a rail pair in a so-called deep racking store, has a carrier arrangement which, in a deactivated transport position, passes under a load resting on the rail pair. The carrier arrangement is disposed, in an activated lifting position, to carry the load from beneath so that it is free of the rail pair. The carriage has a supporting frame or chassis provided with at least four wheels. The carrier arrangement is rigidly connected to the frame or chassis and each wheel is journalled in an associated arm. The arm is pivotally journalled in the frame so as to be able to raise and lower the wheel in relation to the frame. The arm is operated by an operating device.

8 Claims, 3 Drawing Sheets

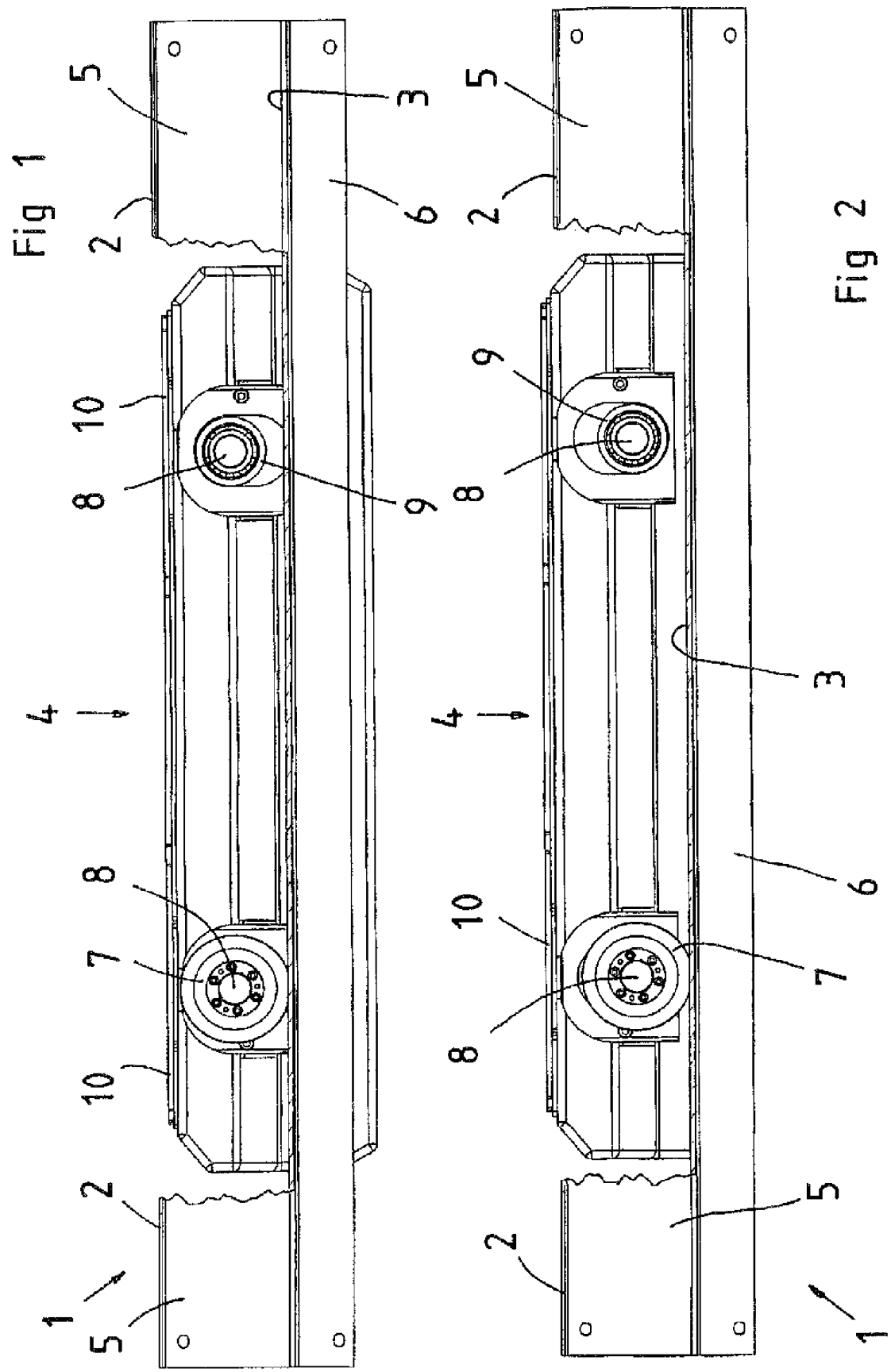

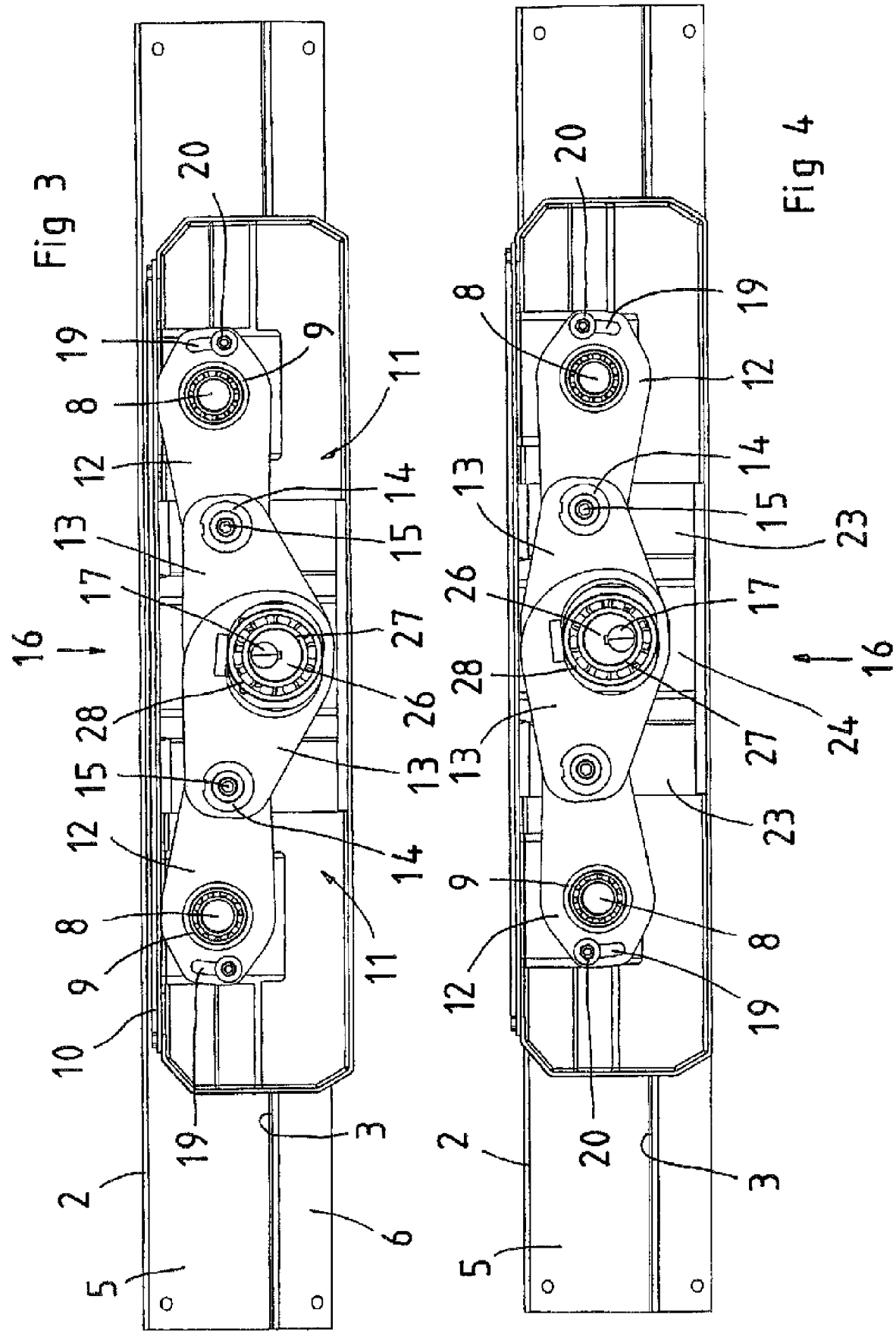

CARRIAGE

This application is a continuation of International Application No. PCT/SE2003/001567, filed Oct. 9, 2003, which designated the U.S.

TECHNICAL FIELD

The present invention relates to a carriage for transporting a load, preferably a pallet, along a rail pair in a so-called deep racking store, comprising carrier means which, in a deactivated transport position of the carriage, are disposed to pass under a load resting on the rail pair and which, in an activated lifting position, are disposed to carry from beneath the load free from the rail pair, the carriage having a supporting chassis/frame provided with at least four wheels.

Background Art

In so-called deep racking stores, use is made of pairs of rails for supporting stored loads which as a rule rest on pallets. Each rail pair is of considerable length so that a plurality of pallets may be disposed along a rail pair.

In a deep racking store, use is often made of a plurality of rail pairs above one another up to such a height which is accessible to a fork-lift truck or other lifting device. In addition, use is often made of a plurality of vertical stacks of rail pairs in side-by-side relationship so that the rail pairs form a grid pattern of both considerable height and width where each rail pair displays, as was mentioned above, considerable length.

For transporting pallets along a rail pair, use is made of a carriage which rolls on the rail pair and is designed in such a manner that, in a deactivated position, it may pass under loads resting on the rail pair. If, on the other hand, it is transferred to an activated lifting position, it lifts from beneath a load resting on the rail pair so that the load is free of the rail pair and can, with the aid of the carriage, be transported along the rail pair.

It will readily be perceived that a pallet lifted up by, for example, a fork-lift truck and placed at an end region of a rail pair may readily be transported with the aid of the carriage to the inner end of the rail pair. The carriage may thereafter return to the outer end of the rail pair to fill the rail pair with additional loads until the complete rail pair is fully loaded.

As a rule, one and the same carriage is employed for transporting loads on different rail pairs, for which reason the carriage is moved from one rail pair to another as required.

In order to lift the load, the carriage has a lifting device with at least so great a lifting distance that the carriage, with the lifting device in a deactivated position, may pass under a load resting on the rail pair while, in an activated lifting position, it lifts the load so high that it is free of the rail pair.

In a prior art carriage of the type described by way of introduction, the lifting device comprises a parallelogram or pantograph mechanism which, in the vertical direction, acts on carrier means disposed on the carriage so that these may be raised and lowered in relation to the carriage. The pantograph mechanism has an upper arm pivotally connected to the carrier means and a lower arm pivotally connected to the chassis or frame of the carriage, the arms also being interconnected to one another and, at this connecting point, further connected to a linear prime mover. Both of the arms are pivotal under the action of the prime mover between a position where they lie approximately in line with one another and where the carrier means are raised, and a position where the arms make an angle with one another and where the carrier means are lowered so that the carriage can pass under a load resting on a rail pair.

The above-described pantograph mechanism functions satisfactorily, but has insufficient load carrying capacity.

Constructions are also previously known in the art where the wheels of the carriage are adjustable in the vertical direction so that the entire carriage is raised and lowered in relation to the rail pair when the load is to be lifted up or deposited on a rail pair.

Problem Structure

The present invention has for its object to design the carriage intimated by way of introduction such that this will display considerably greater lifting capacity than prior art carriages are capable of performing. Further, the present invention has for its object to design the carriage so that it will be simple and economical in manufacture, at the same time as needing but simple maintenance and possessing long service life.

Solution

The objects forming the basis of the present invention will be attained if the carriage intimated by way of introduction is characterised in that the carrier means are rigidly connected to the chassis, that each wheel is journalled in an associated arm which is pivotally journalled in the chassis for raising and lowering the wheel in relation to the chassis, the arm being further operable by means of an operating device.

BRIEF DESCRIPTION OF THE ACCOMPANYING DRAWINGS

The present invention will now be described in greater detail hereinbelow, with reference to the accompanying Drawings. In the accompanying Drawings:

FIG. 1 shows a carriage according to the present invention resting on a rail pair, a part of the one rail having been cut away for purposes of clarity and the carriage being in a deactivated transport position, i.e. in a lowered position;

FIG. 2 shows the carriage according to FIG. 1 in an activated lifting position, i.e. in a raised position;

Figure 5:
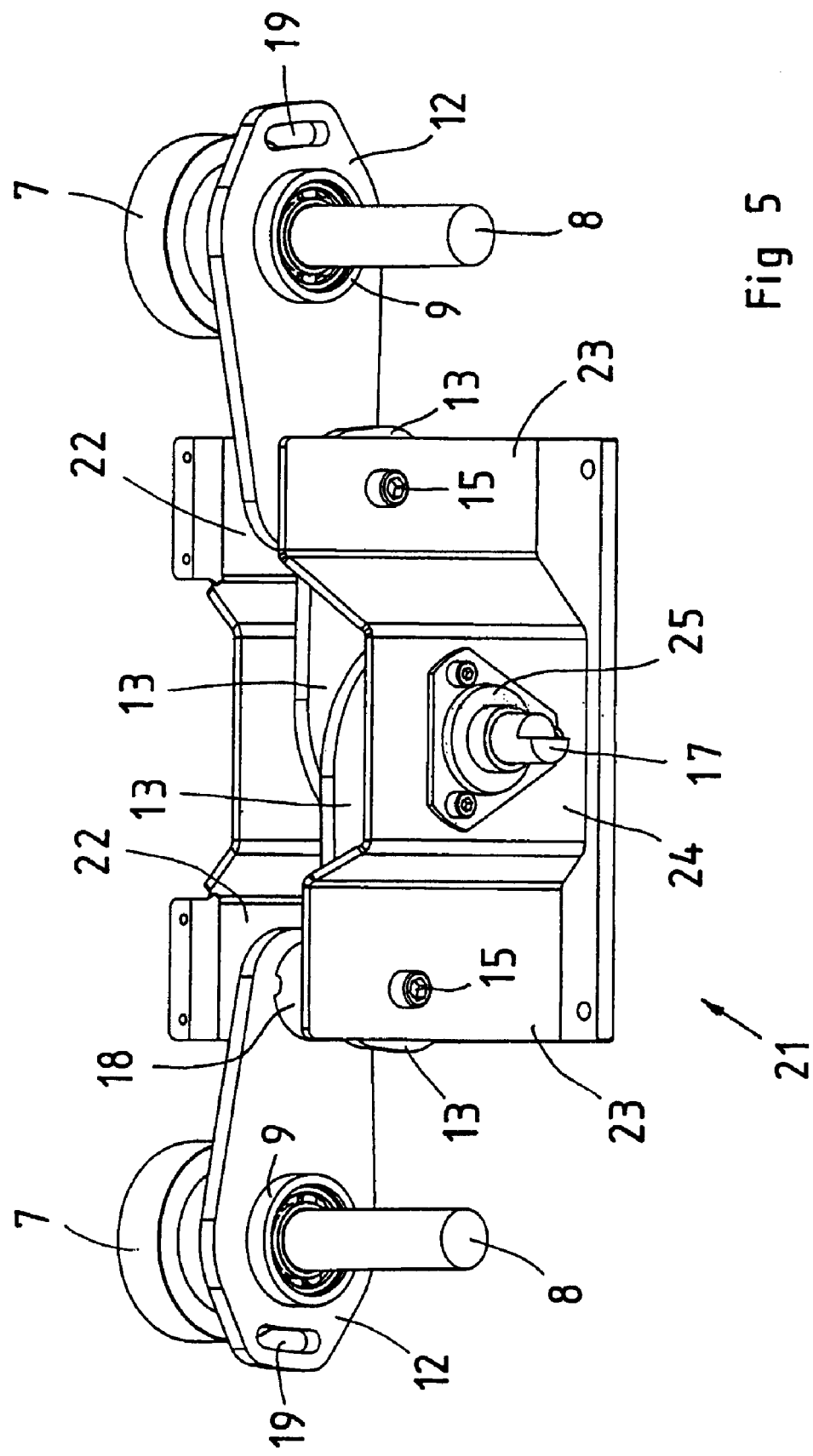

FIG. 3 in a view corresponding to FIG. 1 is a vertical cross section through the carriage;

FIG. 4 in a view corresponding to FIG. 2 is a vertical cross section through the carriage; and FIG. 5 shows a mounting unit included in the carriage with two wheels mounted thereon.

DESCRIPTION OF PREFERRED EMBODIMENT

FIGS. 1 and 2 show a rail 1 included in a rail pair in a deep racking store, the rail having, along its upper defining edge, a substantially horizontal support surface 2 which is intended for carrying a load, preferably a pallet. The support surface 2 is, in FIGS. 1 and 2, at right angles to the plane of the Drawing and extends towards the observer from this plane.

The rail 1 further has a running surface 3 which is also horizontal and preferably parallel with the support surface 2 and is intended for supporting a carriage 4 according to the present invention. The support surface 2 and the running surface 3 are connected to one another by the intermediary of a wall 5 extending in the vertical direction of the rail, and further a downwardly directed flange 6 which extends downwards from that edge of the running surface 3 which is turned to face towards the other rail included in a rail pair.

In a rail pair, the two running surfaces 3 lie as horizontal shelves in between both of the walls 5 in the rail pair, while the support surfaces 2 extend away from one another from the upper edge portions of the walls 5.

It will be apparent from FIGS. 1 and 2 that the carriage 4 has wheels 7 which are rotary with wheel axles 8. In the right sides of both Figures, the wheels have been removed for purposes of clarity and it will be apparent that the axles 8 are carried by and rotary in bearings 9, in the illustrated embodiment roller bearings.

On its upper side, the carriage 4 has carrier means 10 which are fixedly secured in the carriage and are thus rigidly connected to a chassis/frame included in the carriage. The carrier means 10 are disposed to engage from beneath with a load resting on a rail pair and lift the load so high that the load is free of the support surfaces 2 of the rail pair when the carriage 4 with the load is to be run along a rail pair. When the carriage 4 is to be run along the rail pair without a load, the carrier means 10 are located on a lower level, so low that the carriage 4 may freely pass under a pallet resting on the rail pair.

In FIG. 1, the carriage is in a deactivated transport position, i.e. the lowered position, while in FIG. 2, the carriage is in an activated lifting position, i.e. the raised position, and it will be apparent on a comparison between these two Figures that the wheel 7 and the axle 8 in FIG. 1 are of considerably higher vertical extent in relation to the carriage than is the case in FIG. 2. From this it follows that the whole carriage 4 is raisable and lowerable for raising and lowering of the carrier means 10 by a corresponding lowering and raising of the wheels 7, respectively. For raising and lowering the wheels in relation to the carriage and in particular its chassis and carrier means 10, use is made of an operating device disposed in the carriage which, in turn, is connected to a prime mover. The operating device will be described in greater detail below.

It will be apparent from FIGS. 3 and 4 that the wheels 7 are each journalled via their axles 8 in their associated arm 11, both of the arms illustrated in FIGS. 3 and 4 each having an outer portion 12 and an inner portion 13. The two arms 11 are journalled in their central regions with journalling devices 14 with pivot shafts 15 in relation to the supporting chassis of the carriage.

For operating the wheels 7 and their axles 8 in the vertical direction, the carriage has an operating device 16 which is disposed for pivoting both of the arms 11 about the pivot shafts 15. The operating device 16 includes an excenter or crank device which engages with the inner ends of the inner portions 13 of the arms 11.

The operating device 16 has a drive shaft 17 which, for its rotation, is connected to a prime mover (not shown on the Drawings), for example an electric motor.

The wheels 7 of the carriage extend in the lateral direction outside the chassis or supporting frame of the carriage so that this be located in between the two downwardly directed flanges 6 on the rails included in a rail pair (see FIG. 1). In order to journal the axles 8 as close to the wheels as possible, the outer arm portions 12 are located a greater distance from the longitudinal centre line of the carriage than is the case for the inner arm portions 13. Between these arm portions, connecting members or sleeves 18 are provided which mutually rigidly connect the two arm portions and which are included in the journal devices 14 of the arms.

Between the insides of the wheels 7 and the roller bearings included in the bearings 9 of the wheels, there are provided spacer sleeves which surround the wheel axles. The roller bearings in the bearings 9 are axially fixed in the outer arm portions 12 of the arms so that axial loadings on the wheels are transferred to these arm portions via the spacer sleeves and the roller bearings. In order to avoid flexural movements in the outer portions 12 of the arms, these are provided with guides whose purpose is to prevent axial movement of the wheel and the outer portions 12 of the arms in relation to the chassis of the carriage by transferring thereto the above-mentioned loadings. The guides include elongate apertures 19 in the outer portions 12 of the arms, the apertures being concentric about the pivot shafts 15 of the arms and being disposed at the outer ends of the outer arm portions 12 in particular outside the wheel axles 8. As is apparent from FIGS. 3 and 4, stub shafts extend through these apertures 19 which, at their ends facing towards the observer of FIGS. 3 and 4, have heads or washers 20 which prevent movement towards the observer of FIGS. 3 and 4 of the outer end portions of the arms 11. In such instance, the fixing of the outer portions 12 of the arms takes place in the longitudinal direction of the wheel axles 8 in that the stub shafts with the heads 20 are fixed in the chassis of the carriage. On the rear side (in FIGS. 3 and 4) of the arms, these abut against sliding guides which are rigidly connected to the chassis.

It should be mentioned that the wheels 7 pairwise have a common and through-going axle 8 whereby the wheels are interconnected to each other in the axial direction, so that, in principle, both of the guides for the outer portions 12 of the arms will thereby share an axial loading on the wheels. It should also be mentioned that the wheel axles 8 are parallel with the pivot shafts 15 of both arms 11.

It will be apparent from FIG. 5 that, on each side of the carriage, the arms 11 and the operating device 16 disposed there are mounted in a mounting unit 21 which, in its turn, is secured in the chassis of the carriage. The mounting unit 21 has two outer or first walls 22 which are at right angles to the pivot shafts 15 of the arms 11, as well as two inner or second walls 23 which are parallel with the outer walls 22 and which are located a distance inside them. The distance between the outer and inner walls is such that the sleeves 18 which the connect the outer portions 12 of the arms 11 with the inner portions 13, as well as the arms proper, will have space without axial play between the mutually facing sides of these walls. The journals of the arms 11 are supported by the above-mentioned first and second walls 22 and 23.

It will further be apparent from FIG. 5 that the two inner walls 23 in the mounting unit 21 are interconnected int. al. by the intermediary of an additional inner or third wall 24. This wall 24 supports a bearing 25 for the drive shaft 17 and is therefore at right angles to both the drive shaft 17, the pivot shafts 15 and the wheel axles 8.

As was mentioned above, the operating device 16 includes an excenter 26 which is radially offset in relation to the drive shaft 17 (FIGS. 3 and 4). On the excenter, there are disposed two roller bearings side-by-side, i.e. closely joined together in the axial direction. In FIGS. 3 and 4, only the roller bearing most proximal to the observer of the Figure is visible.

The two roller bearings supported by the excenter 26 each have an inner ring 27 and an outer ring 28. The outer ring on the roller bearing located most proximal in FIGS. 3 and 4 is accommodated in an aperture in the inner portion 13 of the left arm in the Figures, while the roller bearing located most distal from the observer of the Figure has its outer ring accommodated in a corresponding aperture in the inner portion 13 of the right arm 11 in the Figures, whose inner portion 13 in the Figures is located behind the inner portion of the left arm. In the vertical direction, the apertures in the inner portion 13 of the arms are of approximately the same extent as the diameter of the outer rings of the two roller bearings, so that the outer rings may be accommodated substantially without play in the apertures in the vertical direction. On the other hand, in the horizontal direction the apertures are of greater extent so that rotation of the excenter 26 a complete revolution may be put into effect without the outer rings of the bearings coming to contact with the left and right defining surfaces in the apertures in FIGS. 3 and 4.

The operating device 16 has an upper and lower dead point, the arms 11 in the lower dead point of the operating device having their outer portions 12 raised, while the opposite applies when the operating device 16 is located in the upper dead point. As a result, the major advantage will be afforded that loadings on the wheels in the vertical direction will not be transferred to the prime mover that drives the operating device 16 when the carriage is located in its activated lifting position and in its deactivated transport position, in other words the operating device is "self-locking" when the wheels 7 are located in their maximum raised and maximum lowered positions in relation to the chassis.

In the foregoing, the bearings 9 of the wheels 7 have been described as roller bearings. Possibly, other types of bearings could be employed, for example bearings with different types of bushings. The same circumstance applies to the bearings for the drive shaft 17 and the bearings between the excenter 26 and the apertures of the arms 11. Possibly, one variation could be conceivable where both of the roller bearings on the excenter 26 are replaced by a bearing whose outer ring engages with the apertures in the two arms 11.

What is claimed is:

1. A carriage for transporting a load along a rail pair in a so-called deep racking store, comprising a carrier arrangement which, in a deactivated transport position of the carriage, is disposed to pass under a load resting on the rail pair and which, in an activated lifting position, is disposed to carry from beneath the load free from the rail pair, the carriage having a supporting chassis/frame provided with at least four wheels, wherein the carrier arrangement is rigidly connected to the chassis; each wheel is journalled in an associated arm which is pivotally journalled in the chassis for raising and lowering the wheel in relation to the chassis, the arm being further operable by an operating device, wherein the operating device includes a excenter device disposed on each side of the carriage and is motionally interconnected with arms disposed there for operation thereof, wherein the excenter devices are disposed on a common shaft which is connected to a prime mover, and wherein the excenter devices have an upper and a lower dead point; and the wheels in the upper dead point are located in downwardly displaced positions lifting the carriage in relation to the rail pair, while the wheels in the lower dead point are located in upwardly displaced positions where the carriage is lowered so that its carrier arrangement is free from the underside of a load resting on the rail pair.

2. The carriage as claimed in claim 1, wherein each excenter device has an excenter member which is offset radially in relation to its rotation shaft; the excenter member being accommodated in the inner ring in at least one roller bearing; an outer ring of the roller bearing being accommodated in apertures in inner portions of two arms, the apertures being of an extent in a vertical direction which substantially corresponds to a diameter of the outer ring.

3. The carriage as claimed in claim 2, wherein the arms on each side of the carriage have pivot shafts disposed between and carried by two mutually approximately parallel first and second walls included in a mounting unit; the excenter device has a bearing which is carried by a third wall approximately parallel with remaining walls and included in the mounting unit; and the third wall is located more proximal a center of the carriage seen in its width direction than the remaining walls.

4. A carriage for transporting a load along a rail pair in a so-called deep racking store, comprising a carrier arrangement which, in a deactivated transport position of the carriage, is disposed to pass under a load resting on the rail pair and which, in an activated lifting position, is disposed to carry from beneath the load free from the rail pair, the carriage having a supporting chassis/frame provided with at least four wheels, wherein the carrier arrangement is rigidly connected to the chassis; each wheel is journalled in an associated arm which is pivotally journalled in the chassis for raising and lowering the wheel in relation to the chassis, the arm being further operable by an operating device, wherein the operating device includes a excenter device disposed on each side of the carriage and is motionally interconnected with arms disposed there for operation thereof, and wherein the excenter devices have an upper and a lower dead point; and the wheels in the upper dead point are located in downwardly displaced positions lifting the carriage in relation to the rail pair, while the wheels in the lower dead point are located in upwardly displaced positions where the carriage is lowered so that its carrier arrangement is free from the underside of a load resting on the rail pair.

5. A carriage for transporting a load along a rail pair in a so-called deep racking store, comprising a carrier arrangement which, in a deactivated transport position of the carriage, is disposed to pass under a load resting on the rail pair and which, in an activated lifting position, is disposed to carry from beneath the load free from the rail pair, the carriage having a supporting chassis/frame provided with at least four wheels, wherein the carrier arrangement is rigidly connected to the chassis; each wheel is journalled in an associated arm which is pivotally journalled in the chassis for raising and lowering the wheel in relation to the chassis, the arm being further operable by an operating device, wherein the operating device includes a excenter device disposed on each side of the carriage and is motionally interconnected with arms disposed there for operation thereof, and wherein each excenter device has an excenter member which is offset radially in relation to its rotation shaft; the excenter member being accommodated in the inner ring in at least one roller bearing; an outer ring of the roller bearing being accommodated in apertures in the inner portions of two arms, the apertures being of an extent in a vertical direction which substantially corresponds to a diameter of the outer ring.

6. A carriage for transporting a load along a rail pair in a so-called deep racking store, comprising a carrier arrangement which, in a deactivated transport position of the carriage, is disposed to pass under a load resting on the rail pair and which, in an activated lifting position, is disposed to carry from beneath the load free from the rail pair, the carriage having a supporting chassis/frame provided with at least four wheels, wherein the carrier arrangement is rigidly connected to the chassis; each wheel is journalled in an associated arm which is pivotally journalled in the chassis for raising and lowering the wheel in relation to the chassis, the arm being further operable by an operating device, wherein the operating device includes a excenter device disposed on each side of the carriage and is motionally interconnected with arms disposed there for operation thereof, and wherein the arms on each side of the carriage have pivot shafts disposed between and carried by two mutually approximately parallel first and second walls included in a mounting unit; the excenter device has a bearing which is carried by a third wall approximately parallel with remaining walls and included in the mounting unit; and the third wall is located more proximal a center of the carriage seen in its width direction than the remaining walls.

7. A carriage for transporting a load along a rail pair in a so-called deep racking store, comprising a carrier arrangement which, in a deactivated transport position of the carriage, is disposed to pass under a load resting on the rail pair and which, in an activated lifting position, is disposed to carry from beneath the load free from the rail pair, the carriage having a supporting chassis/frame provided with at least four wheels, wherein the carrier arrangement is rigidly connected to the chassis; each wheel is journalled in an associated arm which is pivotally journalled in the chassis for raising and lowering the wheel in relation to the chassis, the arm being further operable by an operating device, wherein the operating device includes a excenter device disposed on each side of the carriage and is motionally interconnected with arms disposed there for operation thereof, wherein the excenter devices are disposed on a common shaft which is connected to a prime mover, and wherein each crank- or excenter device has an excenter member which is offset radially in relation to its rotation shaft; the excenter member being accommodated in the inner ring in at least one roller bearing; an outer ring of the roller bearing being accommodated in apertures in the inner portions of two arms, the apertures being of an extent in a vertical direction which substantially corresponds to a diameter of the outer ring.

8. A carriage for transporting a load along a rail pair in a so-called deep racking store, comprising a carrier arrangement which, in a deactivated transport position of the carriage, is disposed to pass under a load resting on the rail pair and which, in an activated lifting position, is disposed to carry from beneath the load free from the rail pair, the carriage having a supporting chassis/frame provided with at least four wheels, wherein the carrier arrangement is rigidly connected to the chassis; each wheel is journalled in an associated arm which is pivotally journalled in the chassis for raising and lowering the wheel in relation to the chassis, the arm being further operable by an operating device, wherein the operating device includes a excenter device disposed on each side of the carriage and is motionally interconnected with arms disposed there for operation thereof, wherein the excenter devices are disposed on a common shaft which is connected to a prime mover, and wherein the arms on each side of the carriage have pivot shafts disposed between and carried by two mutually approximately parallel first and second walls included in a mounting unit; the excenter device has a bearing which is carried by a third wall approximately parallel with remaining walls and included in the mounting unit; and the third wall is located more proximal a center of the carriage seen in its width direction than the remaining walls.

* * * * *